United States Patent [19]

Kita et al.

[11] 4,283,760
[45] Aug. 11, 1981

[54] METHOD AND APPARATUS FOR CONTROLLING DATA TRANSFER DIRECTION ON A DATA BUS

[75] Inventors: Yuzo Kita, Fuchu; Noboru Yamaguchi; Masaru Shibukawa, both of Kokubunji; Kazuo Minorikawa, Nishi-ooizumimachi, all of Japan

[73] Assignee: Hitachi, Ltd., Tokyo, Japan

[21] Appl. No.: 949,575

[22] Filed: Oct. 10, 1978

[30] Foreign Application Priority Data

Oct. 11, 1977 [JP] Japan .................................. 52-120939

[51] Int. Cl.³ .............................................. G06F 13/00
[52] U.S. Cl. ................................................. 364/200
[58] Field of Search ............................... 364/200, 900

[56] References Cited

U.S. PATENT DOCUMENTS

| | | | |
|---|---|---|---|
| 4,053,950 | 10/1977 | Bourke et al. | 364/200 |
| 4,056,848 | 11/1977 | Giley | 364/200 |
| 4,067,059 | 1/1978 | Derchak | 364/200 |
| 4,075,691 | 2/1978 | Davis et al. | 364/200 |
| 4,080,651 | 3/1978 | Cronshaw et al. | 364/200 |
| 4,099,236 | 7/1978 | Goodman et al. | 364/200 |
| 4,122,520 | 10/1977 | Adamchick et al. | 364/200 |
| 4,137,565 | 1/1979 | Mager et al. | 364/200 |

OTHER PUBLICATIONS

"M6800 Microprocessor Applications Manual", Published by Motorola in 1975, pp. 4-31 to 4-38.
Microprocessors and Microcomputers by Soucek, Published by John Wiley and Sons in 1976, pp. 196-208.
Microprocessors & Small Digital Computer Systems for Engineers & Scientists by Korn, Published by McGraw Hill in 1977, pp. 155-164.

*Primary Examiner*—Charles E. Atkinson
*Assistant Examiner*—Gary Chin
*Attorney, Agent, or Firm*—Craig and Antonelli

[57] ABSTRACT

In a system comprising a memory, an input/output control device, a direct memory access controller and a data bus, the transfer of data between the memory and the input/output control device via the data bus by means of said direct memory access controller during the period of direct memory access mode is effected by controlling the data transfer direction on a data bus so that a control signal for determining the direction of transferring the data by said data bus is recognized in an inverted manner at the memory or the input/output control device only during the period of a data transfer cycle in the direct memory access mode.

6 Claims, 19 Drawing Figures

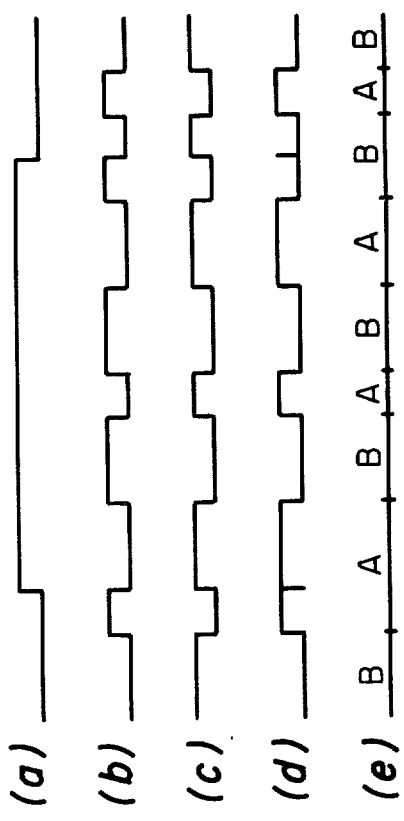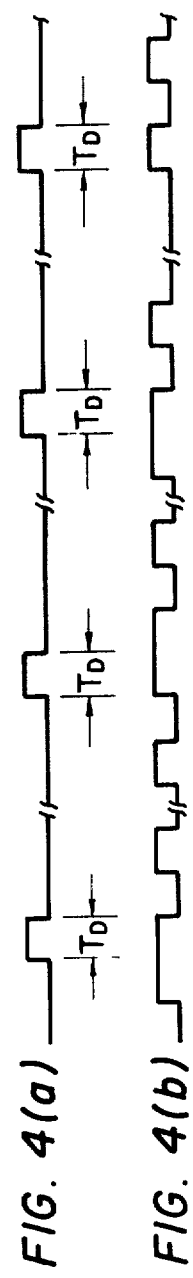
FIG. 3 PRIOR ART
FIG. 4(a)
FIG. 4(b)
FIG. 4(c)

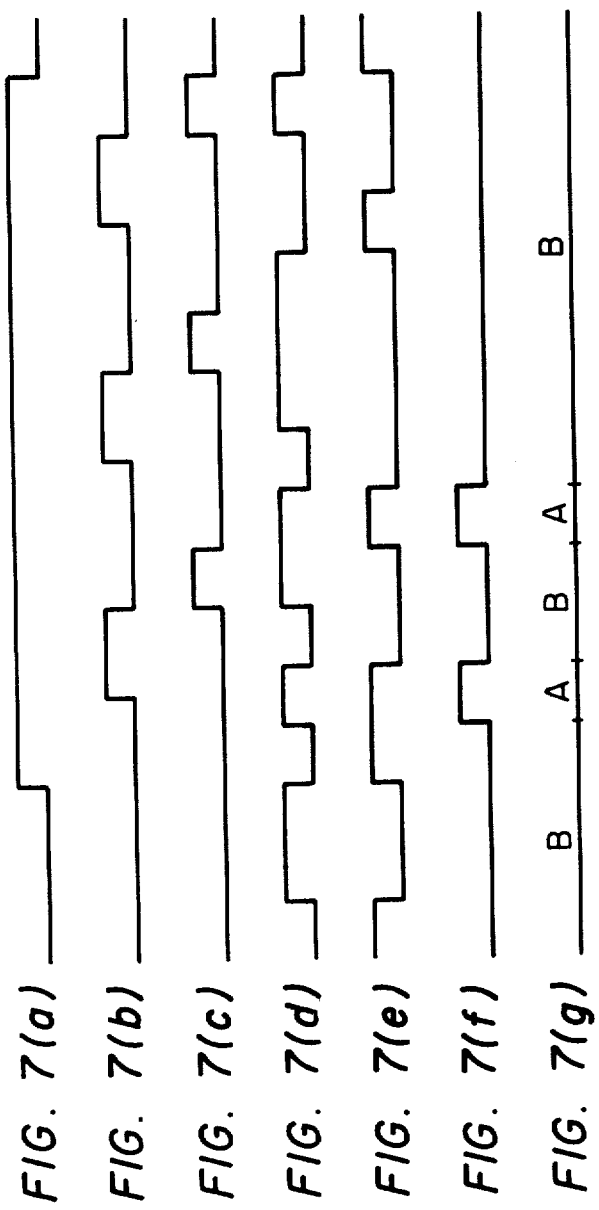

METHOD AND APPARATUS FOR CONTROLLING DATA TRANSFER DIRECTION ON A DATA BUS

BACKGROUND OF THE INVENTION

1. Field of the Invention

The present invention relates to a method and an apparatus for controlling the direction of data transfer on a data bus in a system having the ability to effect direct memory access (hereinafter referred to as DMA).

2. Description of the Prior Art

FIG. 1 schematically shows the setup of a conventional data processing system having DMA transfer, comprising a central processing unit (hereinafter referred to as CPU) 1, a main memory 2, a DMA controller for 3 for controlling the DMA transfer, and an input/output controller 4 for controlling data transfer for an input/output device 5, wherein the data is transferred among these devices through a data bus 6 and an address bus (not shown). Although these devices are controlled via control buses, the drawing shows only one signal line among them, i.e. it shows only a read-out/write-in control line (hereinafter called R/W control line) 7 for determining the direction of transferring the data.

In order to transfer data between main memory 2 and input/output controller 4, a program controlled I/O (PCIO) transfer mode may be employed being controlled by the program of the CPU 1. The data may also be directly transferred between the main memory 2 and the input/output controller 4 independent of the control of the CPU 1, based upon the DMA transfer mode. In these two cases, the above-mentioned R/W control line 7 can be commonly employed even in the PCIO transfer mode or the DMA transfer mode. Therefore, in order to use the R/W control line 7 for the DMA transfer mode, the signal levels of the R/W control line 7 produced by the DMA controller 3 must be set at conflicting levels by some means depending upon the main memory 2 and the input/output controller 4. For instance, when the DMA controller 3 has sent a high level control signal (H level) to th R/W control line 7, and when the main memory 2 has recognized it as the H level, the input/output controller 4 must recognize it as the low level (L level). The reason is because the main memory 2 and the input/output controller 4 must determine without interfering the direction of data transfer from the main memory 2 to the input/output controller 4 or the direction of data transfer from the input/output controller 4 to the main memory 2. Under the DMA transfer mode, the input/output controller 4 usually recognizes the signal level of the R/W control line 7 as inverted.

FIG. 2 shows the setup of a circuit of part of a conventional input/output controller 4, or in other words, it shows a portion of a control circuit for controlling the direction of data transfer of the data bus under the DMA transfer mode.

In FIG. 2, reference numeral 21 represents a flip-flop that will be set in the DMA transfer mode (hereinafter referred to as DMA-FF), reference numerals 22 and 23 denote AND gates, 24 a wired OR gate, 25 and 26 inverters, 27 a data bus buffer for transferring data from the data bus 6 toward the input/output controller 4, 28 a data bus buffer for transferring the data from the input/output controller 4 toward the data bus 6, 29 an input register, and reference numeral 30 designates an output register.

FIG. 3 is a timing chart for illustrating the operation of the circuit of FIG. 2, in which the diagram (a) represents an output from the terminal Q of the DMA-FF 21, the diagram (b) represents a read-out/write-in control signal (hereinafter referred to as R/W control signal) of the R/W control line 7, the diagram (c) represents an output of the inverter 25, diagram (d) represents an output of the wired OR gate 24, and the diagram (e) shows the state of controlling the direction of data transfer using the data bus buffers 27 and 28. In the diagram (e) of FIG. 3, symbol A shows the state in which the data bus buffers 28 is driven, i.e. the state in which data is transferred from the input/output controller 4 toward the data bus 6, and B shows the state in which the data bus buffer 27 is driven, i.e. the state in which the data is transferred from the data bus 6 toward the input/output controller 4.

Referring to FIG. 2, before DMA transfer commences, the DMA-FF 21 is set by a control signal from the CPU 1 of FIG. 1, whereby a predetermined amount of data is transferred. After DMA transfer is finished, the DMA-FF 21 is reset by a control signal from the CPU 1 or by a signal of the input/output controller 4. While the DMA-FF 21 is being set, i.e. during the DMA transfer mode, the output of the terminal Q of the DMA-FF 21 goes high (H level) as shown by the diagram (a) of FIG. 3, whereby AND gate 23 is enabled, and a signal obtained by inverting the R/W control signal of the R/W control line 7 through the inverter 25 is applied to the wired OR gate 24, such that the $\overline{R/W}$ control signal is recognized. On the other hand, under ordinary PCIO transfer mode in which the DMA-FF 21 is reset, the $\overline{Q}$ output of the DMA-FF 21 goes high (H level), whereby AND gate 22 is enabled, and the R/W control signal is directly applied to the wired OH gate 24.

Therefore, if the R/W control signal shown by the diagram (b) of FIG. 3 is applied to the R/W control line 7, the output of the inverter 25 acquires the form as shown in the diagram (c) of FIG. 3. Consequently, the output of the wired OR gate 24 acquires the form as shown in the diagram (d) of FIG. 3, and the main bus buffers 27 and 28 are controlled as shown in the diagram (e) of FIG. 3 thereby to control the direction of data transfer.

Here, the DMA transfer mode may be divided into a transfer in burst mode in which the data bus is seized during the period of DMA transfer, and a transfer in cycle steal mode which performs the transfer of data in parallel with the program processing using the CPU during the period of DMA transfer. When the above-mentioned conventional control method is being put into practice, the transfer in burst mode presents no problem since it seizes the bus. However, with the transfer in cycle steal mode in which the transfer of data and the processing of program are performed in parallel, the conventional system which recognizes the $\overline{R/W}$ control signal throughout the period of DMA transfer mode had to produce the $\overline{R/W}$ control signal when the CPU was to access the input/output controller during the period of program processing due to any requirement and when the programs were being processed. Consequently, the program necessitated mode control. This mode control was needed for determining the access direction to the input/output controller depending upon whether the DMA mode is taking place or not.

Eventually, program design tended to become very cumbersome.

SUMMARY OF THE INVENTION

An object of the present invention is to provide a method and an apparatus for controlling the direction of data transfer, which can be so programmed even during the period of DMA transfer that the input/output controller is handled in the same way as the case of an ordinary mode, eliminating the aforementioned problems that are encountered when the DMA is transferred under the cycle steal mode.

In order to attain the above-mentioned object, according to the present invention, the level of the $\overline{R/W}$ control signal is recognized in the main memory or in the input/output controller only during the period of data transfer cycle which is a portion of the period of DMA transfer, to thereby control the direction of data transfer on the data bus based on the recognized level.

Other objects, features, and advantages of the present invention will become apparent from the below-mentioned description in conjunction with the accompanying drawings.

BRIEF DESCRIPTION OF THE DRAWINGS

FIGS. 3a–3e are timing charts for illustrating the operation of FIG. 2;

FIGS. 4a through 4c are timing charts for illustrating the principle of the control method according to the present invention;

FIGS. 7(a) through 7(g) are timing charts for illustrating the operation of FIG. 6.

DETAILED DESCRIPTION OF THE PREFERRED EMBODIMENTS

FIGS. 4(a) through 4(c) are timing charts for illustrating the principle of the method of controlling the data transfer direction according to the present invention, in which FIG. 4(a) shows a data transfer cycle under DMA transfer.

According to the present invention, a feature resides in the fact that the level of an R/W control signal in the cycle steal transfer mode is recognized in an inverted manner ($\overline{R/W}$) in the input/output controller or in the main memory only during the data transfer cycle $T_D$ which corresponds to the high level periods (H level) in the diagram of FIG. 4(a). Therefore, if the R/W control signals are as shown in the diagram of FIG. 4(b), the control signals recognized by the input/output controller or the main memory will become as shown in the diagram of FIG. 4(c). By so doing, the CPU is allowed to access the input/output controller or the main memory as if it were operated under the ordinary mode, even during the period of DMA transfer, making it possible to easily design the programs.

Figure 5:
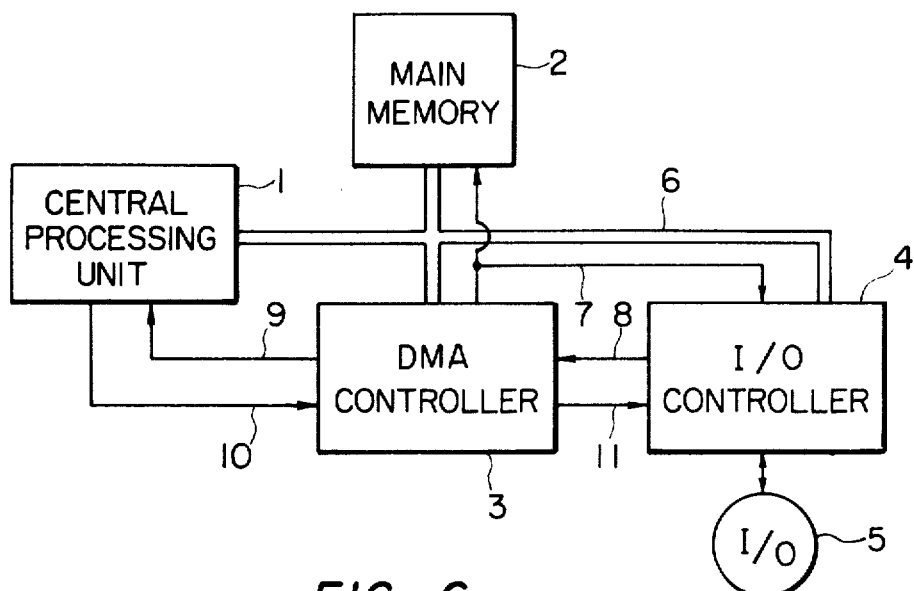
FIG. 5 is a setup diagram showing an embodiment of a data processing system for implementing the control method of the present invention.

FIG. 5 shows a setup of an embodiment of a data processing system for implementing the control method of the present invention, wherein the portion of control signal lines according to the present invention is shown in detail.

Figure 1:
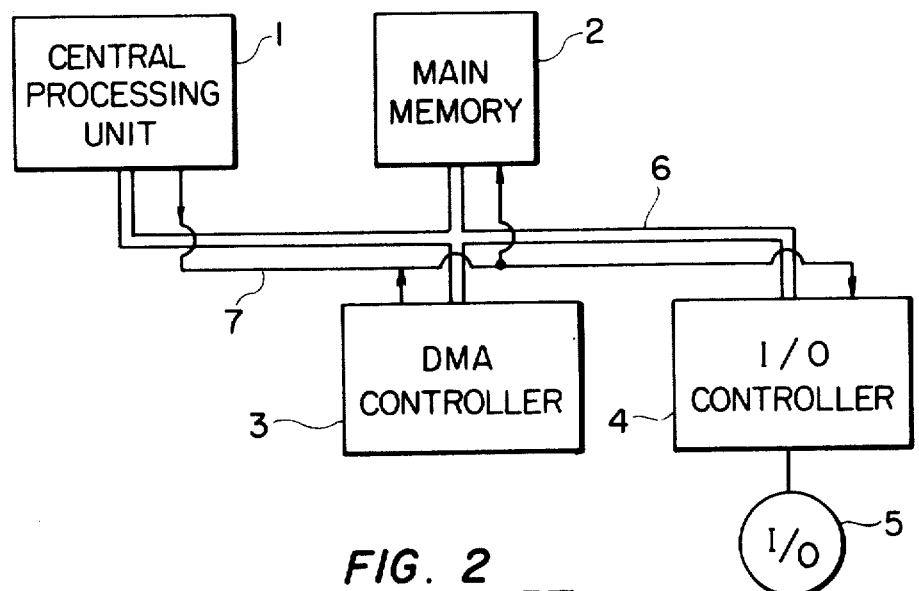
FIG. 1 is a schematic diagram showing the setup of a system having the function of DMA transfer.

In FIG. 5, reference numeral 8 represents a control signal line for requesting the transfer of data, 9 a control signal line through which the DMA control circuit requests the CPU to seize the data bus, 10 a control signal line through which the CPU sends an acknowledgement signal to the DMA control circuit, and reference numerical 11 represents a control signal line for sending a transfer acknowledgement with respect to the requirement of data transfer. Other numerals are used to identify the same parts as in FIG. 1.

Being so controlled, the request for data transfer under the DMA mode is produced by the input/output controller 4 as a transfer request signal and is fed to the DMA controller 3 via the control signal line 8. The DMA controller 3, which has received the request signal, produces a signal for requesting seizure of the data bus, sends it to the CPU 1 through the control signal line 9, and waits for acknowledgement from the CPU 1. The acknowledgement signal, sent from the CPU 1 to the DMA controller 3 via the control signal line 10, means that the data bus 6 is allocated to the DMA controller 3. The DMA controller 3 which has received the acknowledgement signal sends back a transfer acknowledgement signal of one cycle to the input/output controller 4 via the control signal line 11, keeping synchronism with the data transfer clock signals. In general, the input/output controller 4 sends a transfer request signal 8 to the DMA controller 3 in synchronism with the timing of transferring the data between the input/output controller 4 and the input-/output device 5. The data will be transferred between the memory 2 and the input/output controller 4. In this case, the timing of data transfer is maintained in synchronism with the transfer acknowledgement signal of one cycle sent from the DMA controller 3 to the input-/output controller 4 via the control signal line 11, and the transfer of data is executed within one cycle of the transfer acknowledgement signal. After the data transfer of one byte has been completed, the request signal on the control signal line 8 is reset, and the signal for requesting seizure of the bus which is given from the DMA controller 3 to the CPU 1 via the control signal line 9 is also reset. Thus, the data bus 6 is restored again to the ordinary mode under the control of the CPU 1. In the foregoing, the data transfer procedure under the DMA transfer in the cycle steal mode has been described.

Figure 6:
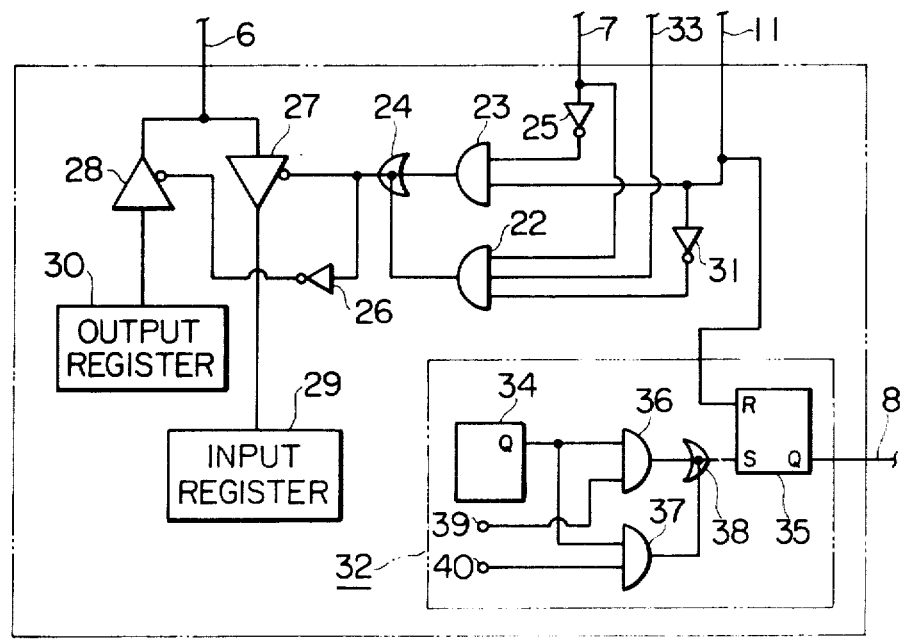
FIG. 6 is a setup diagram showing an embodiment of a circuit portion in the input/output controller for materializing the control method of the present invention.

FIG. 6 shows a setup of an embodiment of a control circuit portion of the input/output controller for implementing the method of controlling the data transfer direction according to the present invention. In this case, the $\overline{R/W}$ control signal of the R/W control signal line 7 is recognized by the input/output controller 4 only during the period when the transfer acknowledgement signal is transferred from the DMA controller via the control signal line 11, i.e. only during the data transfer cycle.

In FIG. 6, reference numeral 31 denotes an inverter, 32 a data transfer control circuit, and 33 a control signal line for transmitting chip select signals. Further, referring to the data transfer control circuit 32, reference numerals 34 and 35 designate flip-flops, 36 and 37 designate AND gates, 38 a wired OR gate, and reference numerals 39 and 40 stand for control terminals.

Figure 2:
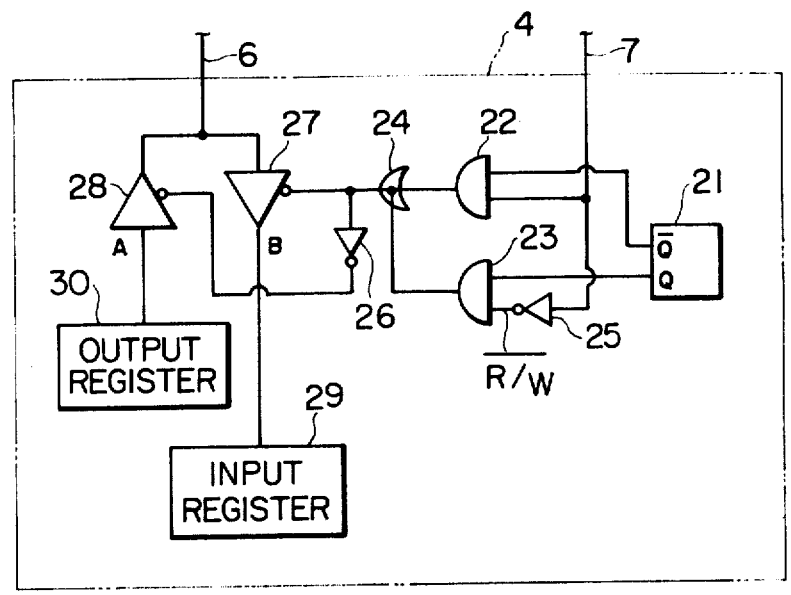
FIG. 2 is a diagram showing the setup of a circuit portion for controlling the direction of data transfer in a conventional input/output controller.

Other numerals correspond to the same parts of FIG. 2, and the flip-flop 34 corresponds to the DMA-FF 21 of FIG. 2.

FIGS. 7(a) through 7(g) are timing charts for illustrating the operation of FIG. 6, in which FIG. 7(a) shows the output of terminal Q of the DMA-FF 34, FIG. 7(b) shows transfer request signals of the control signal line 8, FIG. 7(c) shows transfer acknowledgement signals of the control signal line 11, FIG. 7(d) shows R/W control signals of the R/W control line 7, FIG. 7(e) shows chip select signals of the control signal line 33, FIG. 7(f) shows outputs of the wired OR gate 24, and FIG. 7(g) shows the state of driving the data bus buffers 27 and 28, i.e. the state of the data transfer directions. In FIGS. 7(a) through 7(g), symbol A shows the state in which the data bus buffer 28 is driven, i.e. the state of data transfer from the input/output controller 4 to the data bus 6, and symbol B shows the state in which the data bus buffer 27 is driven, i.e. the state of data transfer from the data bus 6 to the input/output controller 4.

The operation of the circuit of FIG. 6 is described below with reference to FIGS. 7(a) through 7(g).

Referring to FIG. 6, the DMA-FF 34 of the control circuit 32 is set by the CPU 1 before DMA transfer is started, as mentioned earlier, and is reset again by the CPU 1 or the input/output controller 4 after DMA transfer is finished. When the Q output of the DMA-FF 34 goes high (H level), DMA is being effected.

During the period in which the Q output of DMA-FF 34 is high (H level), as shown by FIG. 7(a), if the requirement of a data transfer of one byte is satisfied between the input/output device 5 and the input/output controller 4 or, in other words, if such a requirement is satisfied, that one byte of data being transferred from the input/output device 5 to the main memory 2 is introduced or, otherwise, if such a requirement is satisfied that the input register 29 in the input/output device is ready to receive data from the memory and hence requests the next one byte of data to the memory, then a high level (H level) signal is applied to the control terminal 39 or 40, whereby the output of the AND gate 36 or 37 goes high (H level), causing the flip-flop 35 to be set and producing a transfer request signal shown by FIG. 7(b) to the DMA controller 3 via the control signal line 8.

When the above-mentioned data transfer requirement is satisfied with the Q output of the DMA-FF 34 being low (L level), i.e. when the DMA transfer mode is not being carried out, interruption of data transfer will usually be produced for the CPU instead of producing the transfer requirement signal (not described here).

When the transfer acknowledgement signal (FIG. 7(c)), introduced from the DMA controller 3 via the control line 11, goes high (H level), i.e. when the data transfer cycle of DMA is being carried out, AND gate 23 is enabled and the R/W control signal of the R/W control signal line 7 shown in FIG. 7(d) is inverted by the inverter 25 and fed through the AND gate 22 to the wired OR gate 24, such that the $\overline{R/W}$ control signal is recognized.

On the other hand, when the transfer acknowledgement signal is low (L level), i.e. when the data transfer cycle is not being carried out, AND gate 22 is enabled by the function of the inverter 31, the R/W control signal of the R/W control signal line 7 is directly fed to the wired OR gate 24, and is properly recognized only when the chip select signals shown by FIG. 7(e) are high (H level), i.e. only when the input/output controller is selected. Therefore, the output of the wired OR gate 24 becomes as shown in the FIG. 7(f), whereby the data bus buffers 27 and 28 are controlled correspondingly. That is, as shown in FIG. 7(g), when the output of the gate 24 is low (L level), the data bus buffer 27 is driven enabling the data to be transferred from the data bus 6 to the input/output controller 4. When the output of the gate 24 is high (H level), the data bus buffer 28 is driven, permitting the data to be transferred from the input/output controller 4 to the data bus 6.

As will be understood from the above-mentioned embodiment, according to the present invention, the period in which the R/W control signal produced by the DMA controller is recognized in an inverted manner ($\overline{R/W}$) by the input/output controller under the DMA transfer mode is limited to the periods of data transfer cycle of each byte by DMA. Accordingly, even for transfer in the cycle steal mode, the CPU 1 is allowed to treat the input/output controller 4 in the same manner as in the ordinary mode.

Although the foregoing embodiment has dealt with the case in which the R/W control signal is recognized in an inverted manner by the input/output controller, it is also possible to provide a similar control circuit on the side of the main memory thereby to recognize the R/W control signal in an inverted manner.

It should be further noted that the present invention is by no means restricted to the above-mentioned embodiment only, but can be variously modified within the spirit and scope of the invention defined in the claims.

What is claimed:

1. In a system comprising a memory, an input/output controller for controlling data transfer to and from an input/output device, a data bus, and a direct memory access controller which generates a control signal applied in non-inverted form to at least one of said memory and said input/output controller, said control signal determining the direction of the data transfer in said input/output controller and said memory,
  a method of controlling the direction of data transfer on said data bus, comprising the steps of
  (a) recognizing in an inverted manner the level of the control signal in said input/output controller only during the data transfer cycle in the direct memory access transfer mode under a cycle steal mode, and
  (b) controlling the direction of transferring the data on said data bus in said input/output controller in response to the control signal recognized by said recognizing step(a).

2. A control method according to claim 1, wherein said data transfer cycle is determined by a data transfer acknowledgement signal which is sent back from said direct memory access controller to said input/output controller in response to a data transfer request signal sent from said input/output controller to said direct memory access controller.

3. In a system comprising a memory, and input/output controller for controlling data transfer to and from an input/output device, a data bus, and a direct memory access controller which generates a control signal applied in non-inverted form to at least one of said memory and said input/output controller, said control signal determining the direction of the data transfer in said input/output controller and said memory, an arrangement for controlling the direction of data transfer on said data bus comprising first means in said input/output controller for recognizing in an inverted manner the level of the control signal in said input/output controller only during the data transfer cycle in the direct memory access transfer mode under a cycle steal mode, and second means in said input/output controller for controlling the direction of transferring the data via said data bus in response to said control signal being recognized by said first means.

4. An arrangement according to claim 3, wherein said data transfer cycle is determined by a transfer acknowledgement signal sent from said direct memory access controller to said input/output controller in response to a transfer request signal which is sent from said input/output controller to said direct memory access controller.

5. An arrangement according to claim 4, wherein said first means comprises first input means for introducing said transfer acknowledgement signal, first inverter means for inverting a signal from said first input means, second input means for introducing said control signal, second inverter means for inverting the control signal from said second input means.

a first AND gate coupled to the outputs of said second inverter means and said first input means, and a second AND gate coupled to the outputs of said first inverter means and said second input means.

6. An arrangement according to claim 5, wherein said first means further comprises means for selectively coupling the outputs of said first and second AND gates to said second means and thereby control the direction of data transfer in accordance with the outputs of said first and second AND gates.

* * * * *